United States Patent [19]

Monin

[11] 3,761,640

[45] Sept. 25, 1973

[54] TELEPHONE DIALER WITH TWO DIFFERENT PULSE RATES

[75] Inventor: Claude Monin, Villennes-sur-Seine, France

[73] Assignee: C.I.T. Compagnie Industrielle Des Telecommunications, Paris, France

[22] Filed: Nov. 13, 1970

[21] Appl. No.: 89,221

[30] Foreign Application Priority Data

Nov. 13, 1969 France .............................. 6939051

[52] U.S. Cl. ............................ 179/90 K, 179/90 R

[51] Int. Cl. ............................................ H04m 1/28

[58] Field of Search ...................... 179/90 R, 90 BB, 179/90 K, 90 BD, 16 EC, 16 EB, 16 E; 178/17.5, 2 R, 17 R, 17 C; 340/359, 172.5; 307/221 R, 271, 238; 328/59,37

[56] References Cited

UNITED STATES PATENTS

| | | | |
|---|---|---|---|
| 3,329,775 | 7/1967 | Kurz | 179/16 EC |
| 3,376,391 | 4/1968 | Finkhauser | 179/16 EC |
| 3,362,014 | 1/1968 | Hauck | 340/172.5 |
| 3,457,368 | 7/1969 | Houche | 178/17 R |
| 3,409,742 | 11/1968 | Winter | 179/16 EC |
| 3,434,117 | 3/1969 | Gibson et al. | 340/172.5 |
| 2,777,945 | 1/1957 | Feissel | 328/59 |
| 3,543,295 | 11/1970 | Overstreet | 307/271 |
| 3,579,118 | 5/1971 | Rhodes | 307/271 |
| 3,601,552 | 8/1971 | Barnaby | 179/90 B |
| 3,629,715 | 12/1971 | Brown | 328/48 |

FOREIGN PATENTS OR APPLICATIONS

| | | | |
|---|---|---|---|
| 1,512,037 | 10/1965 | Germany | 179/16 EC |
| 1,193,114 | 6/1964 | Germany | 179/16 EC |

*Primary Examiner*—William C. Cooper
*Assistant Examiner*—Thomas D'Amico
*Attorney*—Sughrue, Rothwell, Mion, Zinn & Macpeak

[57] ABSTRACT

A pulse source, primarily for use with a keyboard in a telephone network, for providing a pulse output compatible with both keyboard and dial telephone networks. The telephone keyboard activates a pulse generator which produces an output compatible with keyboard telephone networks. If the network is of the keyboard type then the output of the generator is applied directly to the telephone network. If the network is of the dial type then the output of the pulse generator is applied to a memory device which stores the output of the pulse generator and generates in response thereto a pulse train at a second rate compatible with a dial network and which corresponds to the output of the keyboard.

14 Claims, 3 Drawing Figures

TELEPHONE DIALER WITH TWO DIFFERENT PULSE RATES

BACKGROUND OF THE INVENTION

1. Field of the Invention

The present invention relates to a pulse source which is particularly, but not exclusively, applicable in automatic telephone systems for providing calling pulses.

2. Description of the Prior Art

Sources of calling pulses for automatic telephone systems in which number selection is carried out by means of a keyboard, instead of the conventional telephone dial, have already been proposed. Various proposals operate with coded frequencies, impedance variation or binary codes. All such proposals provide calling pulses at a relatively fast repetition rate, commensurate with the use of a keyboard. The proposed devices have the disadvantage that they are unable to provide calling pulses at the relatively low repetition rate associated with conventional telephone dials. Thus in telephone systems including both instruments provided with conventional dials and instruments with keyboards, it may be necessary to duplicate much of the circuitry, with consequent increases in the cost involved.

SUMMARY OF THE INVENTION

In accordance with this invention, a pulse source comprises a generator selectively operable to provide pulses at a relatively high repetition rate, a memory connectable to receive and record pulses from said generator and to provide therefrom corresponding pulses at a relatively low repetition rate, and an arrangement providing selective connection of an output of the source to receive pulses from the generator or from the memory.

The relatively high repetition rate is suitably constant and equal to 500 Hz.

Using this invention, it is possible to selectively obtain both fast and slow pulses. When applied to a telephone system the pulse source provides relatively fast calling pulses or relatively slow calling pulses by means of the selective connection.

Thus using the invention in a telephone network, it is possible to connect telephone instruments provided with keyboards into a conventional dial network by making the appropriate connection in the pulse source. Exactly the same keyboard instrument can be connected into a keyboard network using the other selective connection.

The generator preferably comprises a first logic circuit in the form of a parallel-to-series code convertor having a plurality of inputs and a single output. Each input of the first logic circuit is connected to receive a respective control signal. The first logic circuit is adapted to provide at its output, in response to the appearance of a control signal on one input, a pulse train in which the number of pulses is significant of that one input.

When constructed as a calling pulse source for a telephone network, these control signals will be provided by operation of the keys on a keyboard, each input of the first logic circuit being connected to a respective one of the keys. Generally the keys will be 10 in number, indexed from 0 to 9, and the number of pulses in each corresponding pulse train may be equal to or otherwise related to the number carried by each key.

The relatively fast repetition rate is chosen to ensure that a pulse train having a predetermined maximum length can be formed during a predetermined minimum duration of the corresponding call signal. For example, in the case of a keyboard telephone system with 12 keys, it must be possible for a pulse train of 12 pulses to be formed during the period for which the key indexed 12 is depressed, this period defining the duration of the control signal at the first logic circuit input. A repetition rate of 500 Hz will generally be sufficient to ensure this.

In order to improve the reliability of counting these pulses, each may be formed by a predetermined and fixed number of elementary pulses. For example, each pulse may consist of four elementary pulses, so that the basic pulse source will operate at a frequency of 2,000 Hz.

In the preferred embodiment of the invention, the beginning of transmission of a set of calling pulses is marked by a sudden drop in the line current, for example to a value between 10 and 20 milliamperes. This value must be sufficiently low to avoid confusion with the smallest possible value of the signal currents constituting the telephone traffic. Furthermore it must be sufficiently large to avoid confusion with the signal occurring at the end of a call when the telephone handset is replaced.

The end of the transmission of the set of calling pulses is marked by a return of the line current to a value above 20 milliamperes.

BRIEF DESCRIPTION OF THE DRAWINGS

The invention will now be described in more detail, by way of example only, with reference to the accompanying diagrammatic drawing in which.

DESCRIPTION OF THE PREFERRED EMBODIMENT

Figure 1:
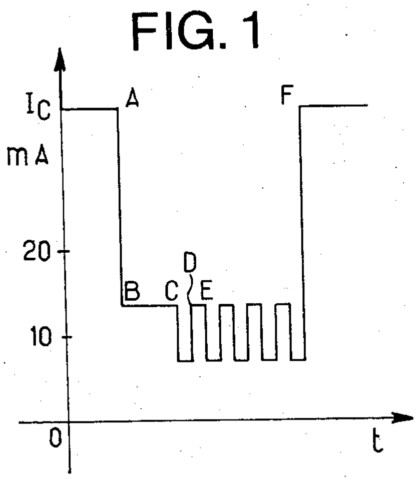
FIG. 1 shows a pulse train.

Referring to FIG. 1, the pulse train shown is significant of the digit 5, and is produced in response to the actuation of a key indexed 5 on a keyboard of a telephone instrument. The pulse train is shown on a plot of the current I in the telephone line connected to the instrument versus time T.

The normal line current has an amplitude $I_C$ which is maintained until point A when the key indexed 5 is depressed. Immediately the line current falls to a value at position B between 10 and 20 milliamperes. Approximately five milliseconds after this drop in current, a pulse train comprising five pulses at a repetition rate of 500 Hz is produced. The overall duration of each pulse, in which the mark-space ratio is 1:1, is 2 milliseconds. Thus the pulse proper that is to say the mark part, has a duration of 1 millisecond. The entire pulse is indicated between points C and E, the "mark" portion terminating at position D. At the end of the fifth pulse, the line current returns to its initial value $I_C$ at point F.

Figure 2:
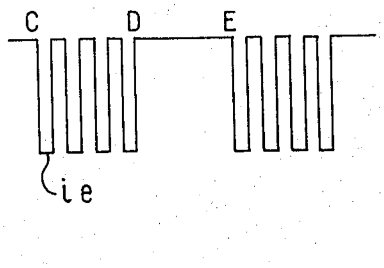
FIG. 2 shows two separate pulses of the pulse train of FIG. 1.

FIG. 2 shows in detail each pulse of the pulse train of FIG. 1. Each pulse consists of four elementary pulses; for example, the pulse extending from point C to point E is made up of four elementary pulses, one of which is indicated ie, at a repetition rate of 2,000 Hz. Using pulses comprising elementary pulses facilitates pulse counting. In the circuitry in which the pulses are counted, one received pulse is counted each time four elementary pulses are counted.

Figure 3:
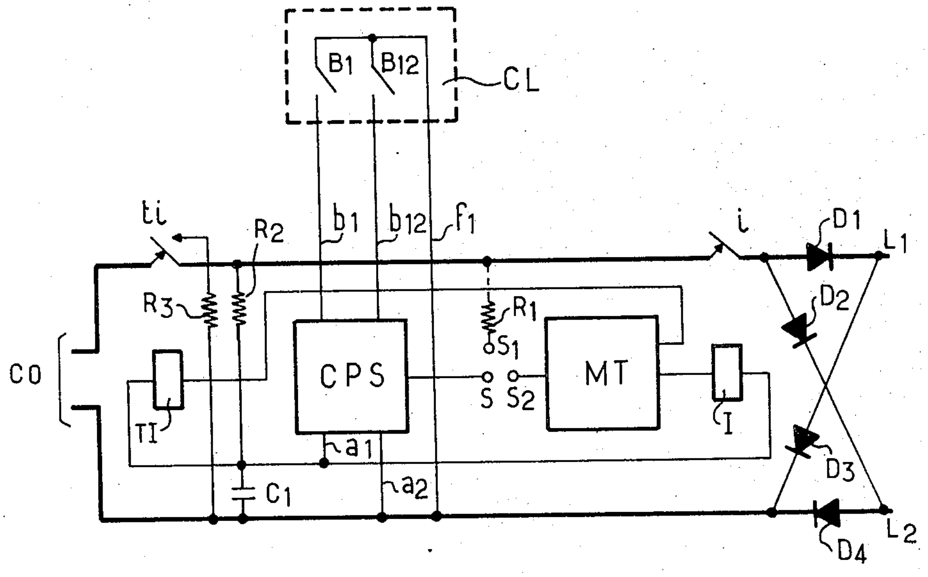
FIG. 3 is a block diagram of the preferred embodiment of a pulse source according to the present invention.

Referring to FIG. 3, the pulse source for providing calling pulses is shown in an automatic telephone network. The source may be incorporated into a telephone instrument itself, or may be constructed as an ancillary unit for connection to a telephone instrument. In the following example, the pulse source will be considered as forming part of the instrument.

The instrument is connected into the telephone network over a line comprising two wires $L_1$ and $L_2$. A handset is connected to the instrument at CO. The instrument is provided with a keyboard CL with which a number to be called is selected.

In the telephone exchange connected at the remote end of wires $L_1$ and $L_2$ an appropriate receiver is incorporated for the relatively rapid pulses provided by the keyboard.

The keyboard CL has 12 keys of which only the first and last, $B_1$ and $B_{12}$ respectively, are shown in the Figure. Each is connected over a respective wire $b$, two of which, $b_1$ and $b_{12}$, are shown in the Figure, to a respective input of a generator CPS. Generator CPS comprises a first logic circuit in the form of a parallel-to-series code converter. The keys of the keyboard CL are all connected to line $L_2$ by a wire $f_1$.

The generator CPS, which is constructed as a metal oxide silicon (MOS) integrated circuit, has a single output S and a pair of supply inputs $a_1$ and $a_2$, the second of which is connected to the wire $L_2$.

A terminal $S_1$ is connected through a resistance $R_1$ to the wire $L_1$. A further terminal $S_2$ is connected to the input of a memory MT consisting of a second logic circuit in the form of a buffer memory MT may be of the type disclosed in U.S. Pat. No. 3,390,379. The memory MT is constructed as a metal oxide silicon (MOS) integrated circuit. It has a first input connected to one terminal of a first relay I. The other terminal of relay I is connected to the supply input $a_1$ of the generator CPS. A second output of the memory MT is connected to a first terminal of a second relay TI. The second terminal of relay TI is also connected to the input $a_1$ of the generator CPS. Input $a_1$ is connected to wire $L_2$ through a capacitance $C_1$, and also to wire $L_1$ through a resistance $R_2$.

The relay I has a normally closed contact $i$ connected in wire $L_1$. The relay TI has a switch contact $ti$ which in the normally closed position is connected in the wire $L_1$, and in the normally open position is arranged to connect the wire $L_1$ through a resistance $R_3$ to the wire $L_2$.

A rectifier bridge, comprising four diodes $D_1$ to $D_4$, is connected in the telephone line at the input so that the connection of the instrument to the line can be made without regard to polarity of the line.

In operation, when the exchange includes the appropriate receiver for fast calling pulses provided from the generator CPS under the control of the keyboard CL, the terminals S and S1 are connected together and the pulses from generator CPS pass directly to the receiver over wires $L_1$ and $L_2$. The calling pulses are formed as follows:

When one of the keys of the keyboard CL is pressed, for example the key $B_5$ indexed 5, the voltage on wire $L_2$ is applied, over wire $f_1$, the switch operated by key $B_5$, and wire $b_5$ to the input of the generator CPS associated with that key.

In response to the detection of this voltage at that input, the generator provides at its output, after the delay of some 5 milliseconds shown in FIG. 1, the pulse train of five pulses also shown in FIG. 1. These pulses then travel to the exchange over the telephone line.

The generator CPS is so arranged that a second signal cannot be provided until at least 30 milliseconds after the end of a previous signal.

Where, however, the instrument is connected over wires $L_1$ $L_2$ to a conventional telephone exchange, which is not provided with the appropriate receiver for the fast calling pulses produced by the generator CPS, terminal S is not connected to terminal $S_1$, but rather to terminal $S_2$.

The fast calling pulses are produced in exactly the same way, by operation of a key of the keyboard CL. However, instead of passing directly to the exchange over the connection S–$S_1$, these fast pulses are applied to the memory MT where they are detected and stored. The memory then provides at its output corresponding pulses at a relatively low repetition rate commensurate with the conventional telephone network in which the instrument is connected.

These slow calling pulses are applied to the relay I. The contact $i$ of the relay opens and closes in synchronism with the pulses, transferring them to the telephone line in the form of interruptions of the line current. The interruptions of the line current, constituting the conventional calling pulses, are detected at the exchange in a conventional manner.

During transmission of the slow calling pulses to the exchange, the relay TI is held energized by the memory MT. This disconnects the handset from the line so that the calling pulses are not heard by the person making the call, while simultaneously looping the line by connecting together wires $L_1$, $L_2$ through the resistance $R_3$. This avoids dropping out of the elements in the exchange.

Normally when the handset is unhooked, the instrument is supplied with electrical energy by the exchange over the telephone line, that is through the wires $L_1$, $L_2$. Since this line is interrupted by contacts $i$ of the relay I, continuity of the supply to the instrument is maintained by a charge built up in the capacitance $C_1$ between interruptions of the line.

The invention is of general application where a keyboard is used for the transmission of signals. Such applications include telephony, telegraphy, and data transmission.

The pulse source just described has the advantage in that, by means of a simple selective connection, it can provide either rapid pulses in systems adapted to handle such pulses, or equivalent slow pulses in such systems that cannot handle the rapid pulses.

While the invention has been particularly shown and described with reference to the preferred embodiment thereof, it will be understood by those skilled in the art that various changes in form and details may be made therein without departing from the spirit and scope of the invention.

I claim:

1. A keyboard network for use in an automatic telephone network, said keyboard network comprising, a. pulse generating means for supplying a decimal coded pulse signal at a first repetition rate;
b. switch means connected to the output of said pulse generating means, said switch means having a first and second state, whereby when said switch means are in said first state said pulse generating means is coupled directly to a telephone line to provide the output of said keyboard network;
c. memory means, connected to said pulse generating means when said switch means are in said second state, for receiving and storing said pulse signal at said first repetition rate and for generating in response to said pulse signal at said first repetition rate a decimal coded pulse signal at a second repetition rate, said first repetition rate being high relative to said second repetition rate; and
d. means coupled to said memory for interrupting at said second rate the current in said line whereby when said switch means are in said second state said memory means controls the connection of the output of said keyboard network to said line through said means for interrupting.

2. A keyboard network as claimed in claim 1, wherein said first repetition rate is constant.

3. A pulse source as claimed in claim 2, wherein said first repetition rate is 500 Hz.

4. A keyboard network as claimed in claim 1 wherein said memory means comprises a second logic circuit including a buffer.

5. A keyboard network as claimed in claim 4, wherein the second logic circuit is constructed as a metal oxide silicon (MOS) integrated circuit.

6. A keyboard network as claimed in claim 1, wherein each input of said pulse generating means is connected to receive a respective control signal and said pulse generating means provides at its output, in response to the receipt of a control signal at its input, a pulse train in which the number of pulses is significant of the signal received at its input.

7. A keyboard network as claimed in claim 6, wherein said first repetition rate is chosen to ensure that a pulse train having a predetermined maximum length can be formed during a predetermined minimum duration of the corresponding control signal.

8. A keyboard network as claimed in claim 1, wherein each pulse provided by said pulse generating means comprises a predetermined and fixed number of elementary pulses.

9. A keyboard network as claimed in claim 6 wherein said interrupting means includes a first relay connected to said memory means said first relay having its contacts arranged to be connected in a line of said network said first relay being operated by pulses from said memory means such that its contacts open and close synchronously with said pulses at said second repetition rate to transfer said pulses to the telephone line by interrupting the line current.

10. A keyboard network as claimed in claim 9, including a capacitor means connected across the telephone lines for maintaining energization, of said keyboard network and an associated telephone instrument, during the interruptions of the line current.

11. A keyboard network as claimed in claim 9, including an accumulator means for maintaining energization, of said keyboard network and an associated telephone instrument, during the interruptions of the line current.

12. A keyboard network as claimed in claim 9, including a second relay means connected to said memory for providing a loop in the telephone line during transmission of the calling pulses on the line whereby a handset of the associated telephone instrument is isolated from the line so that it is not affected by the interrruptions of the line current.

13. A keyboard network as claimed in claim 9, further comprising a keyboard with a plurality of keys wherein each input of the pulse generating means is connected to receive a respective control signal from a respective key of said keyboard of an associated telephone instrument thereby selecting a number to be called.

14. A keyboard network as set forth in claim 9 further including diode bridge means connected between said telephone line and said pulse generating means and memory means, thus rendering immaterial the direction in which said keyboard network is connected to said line.

* * * * *